Jan. 11, 1944.   P. SCHMIDT   2,338,974
MASTER CYLINDER UNIT
Filed Nov. 12, 1938
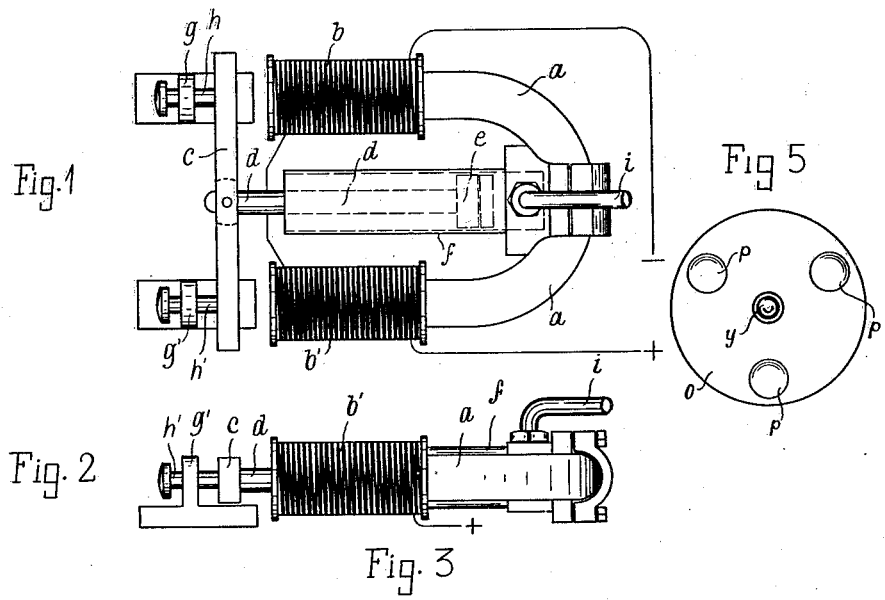
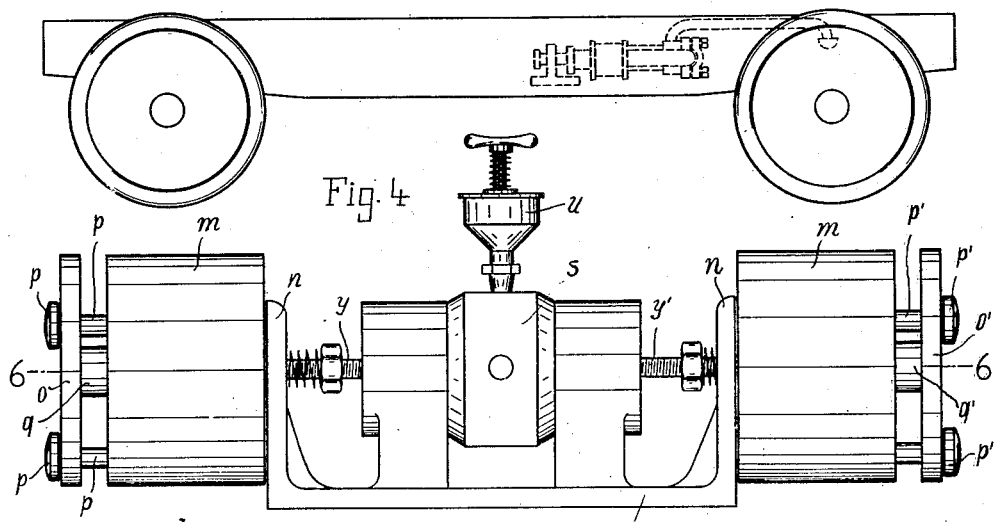
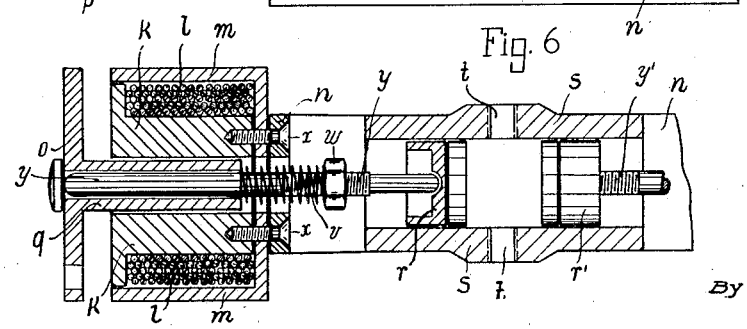
INVENTOR
Paul Schmidt
ATTORNEY Patented Jan. 11, 1944

2,338,974

UNITED STATES PATENT OFFICE 2,338,974

MASTER CYLINDER UNIT

Paul Schmidt, Solingen, Germany; vested in the Alien Property Custodian

Application November 12, 1938, Serial No. 240,197
In Germany November 15, 1937

1 Claim. (Cl. 60—54.6)

This invention relates to a master cylinder unit for braking device for trailers of motor vehicles.

Up to the present single or multiple axle trailers hitched to private cars or to light lorries cannot be properly braked from the motor vehicle because, contrary to heavy lorries, a suitable braking device is lacking. In the case of heavy lorries this objection does not arise owing to the presence of a pneumatic brake necessary for increasing safe service, this brake being connected with a similar brake system of the trailer or trailers with the result that they are reliably and permanently braked from the motor vehicle when this is being braked. The use of a pneumatic brake is only suitable for heavy lorries, in which the pneumatic brake can operate to full capacity. In the case of light lorries and even private cars to which trailers are hitched, the use of a pneumatic brake would not be practical, apart from the fact that the cost of the installation of a pneumatic brake is so high that it constitutes a primary factor not in the case of heavy lorries, but in the case of light lorries or even private cars, merely to enable the braking of the trailer. Consequently, so-called close-up brakes are used, which, however, are open to the objection that for example when running down hill and when the trailer closes up to the motor vehicle, an undesired braking effect is produced by the close-up brake and causes detrimental jerk-like shocks on the gear and differential of the engine of the motor vehicle. Further, the objections of a close-up brake become particularly apparent when a motor vehicle to which a trailer is hitched must be run in reverse owing to some circumstance due to the service or traffic as then the wheels of the trailer lock, even if the close-up brake is in proper condition. The damages which may result herefrom, especially if the locking is repeated frequently, are considerable.

These objections are overcome by the invention in that when contacts are actuated by means of the brake pedal, a horse-shoe magnet with independent coils attracts a horizontal plate at one end by one of the coils, or at both ends by the two coils, the plate surrounding the piston rod of the liquid pressure piston of the main cylinder and being hingedly connected thereto.

Instead of the horse-shoe magnet two pot-shaped magnets may be used in such a manner that, when contacts are actuated by means of the brake pedal, one or both of the opposite pot-shaped magnets attracts or attract a plate arranged in front of the same, each plate surrounding the piston rod of a liquid pressure piston of a common main cylinder, extending through the corresponding magnet.

By means of the braking device according to the invention, which can easily be connected to an oil pressure or mechanical brake, the trailer hitched to a private car or light lorry can be effectively and lastingly braked from the motor vehicle.

Two embodiments of the invention are illustrated by way of example in the accompanying drawing in which—

Fig. 1 shows in plan view a device with horse-shoe magnets,

Fig. 2 is a side elevation of Fig. 1,

Fig. 3 is a diagrammatic view of the chassis of a trailer,

Fig. 4 shows in side elevation a device with two pot-shaped magnets,

Fig. 5 is a side elevation of Fig. 4,

Fig. 6 is a section on line 6—6 of Fig. 4.

The braking device illustrated in Figs. 1, 2 and 3 consists of a horse-shoe magnet $a$ with separate coils $b$, $b'$ and with a horizontal plate $c$ which surrounds the piston rod $d$ of the liquid pressure piston $e$ of the main cylinder $f$ and is hingedly connected therewith. The plate $c$ is longitudinally shiftable in bearing brackets $g$, $g'$ by means of bolts $h$.

The device operates in the following manner:

When a contact is actuated by means of the brake pedal and closes a circuit from a source of current into the magnet $a$, the horizontal plate $c$ is attracted at one end by one of the coils or at both ends by both coils, $b$, $b'$ according to whether the trailer is to be gently or strongly braked. Consequently, the liquid pressure piston $e$ of the cylinder $f$ is moved outwards. A tube $i$ extends from the cylinder $f$ and branches into arms leading to the rear axle of the trailer and each terminating in a braking cylinder mounted in the brake disc, the pistons of the braking cylinder acting directly on the brake blocks or on the brake bands. The piston $e$ in moving forward exerts a pressure on the braking liquid enclosed in the tube $i$ and is transmitted uniformly over the entire area of the tube according to physical law and thus also gets into the braking cylinder whose piston is thus forced outwards and brings the brake blocks to bear on the brake drum with the result that the desired braking effect is obtained.

The braking device illustrated in Figs. 4, 5 and 6 differs from that above described merely in that two pot-shaped magnets are used instead of a horse-shoe magnet. Each of these pot-shaped magnets comprises a core $k$, a coil $l$ and a pot $m$ secured to the core $k$ by screws $x$. The pot-shaped magnets are fixed by screws on the frame $n$ of the device. Plates $o$, $o'$ are mounted on bolts $p$, $p'$ one in front of each of the pot-magnets, and surround piston rods $q$, $q'$ respectively of the liquid pressure pistons $r$, $r'$ mounted in a common main cylinder $s$ from whose bores $t$, $t'$ pipes extend to the rear axle of the trailer. A pump $u$ serves for pumping the oil into the main cylinder $s$. The plate $o$ and piston rod $q$ are rigidly connected together, as are also the plate $o'$ and the piston rod $q'$, while the bolts $p$, $p'$ limit the rearward movements of the plates $o$ and $o'$ so that only one piston may be actuated.

It is to be noted that both pistons $r$ and $r'$ need not move towards each other. The initial position of both pistons $r$ and $r'$ is limited by bolts $p$, $p'$ against which the plates $o$ and $o'$ engaging over the piston rods $q$ and $q'$ strike. In this manner it is evidently possible to actuate only one of the piston rods $r$ or $r'$.

This braking device operates in substantially the same manner as that above described.

When a contact is actuated by the brake pedal, current is supplied to the pot-shaped magnets from a source of current, and one or both of the plates $o$, $o'$ are attracted by the pot-shaped magnets according to whether the trailer is to be gently or strongly braked. The pistons $r$, $r'$ are thus moved away from the magnets and exert pressure on the braking liquid in the pipe conduits, which pressure is necessary for obtaining the braking effect in the manner above described. In other words, it is possible to attract one of the plates $o$ or $o'$ or both of these plates and therefore to push one piston or both pistons $r$ and $r'$ according to whether the braking is to be moderate or complete. The braking effect is increased according to the reduction of the liquid volume, depending on whether one or both pistons are moved forwardly. Spring devices $v$ are associated with the piston rods $q$ and $q'$ to cushion movements of the pistons. Each piston rod is formed of telescoping sections $q$ and $y$ as illustrated in Fig. 6, and the spring $v$ on each piston rod engages at one end the larger section $q$ of the piston rod and at its other end a nut $w$ adjustably threaded upon a threaded portion of the smaller section $y$ of the piston rod which carries the piston plunger.

I claim:

An electro-magnet braking device in which two reciprocating pistons work, comprising in combination with two pistons and two piston rods, two pot-shaped magnets through which the piston rods respectively extend, a plate on the outer end of each piston rod and opposite the adjacent magnet and adapted to be attracted by said magnets, means for limiting movements of said plates away from said magnets, means for cushioning reciprocatory movements of each piston rod in one direction, an oil filled cylinder in which said pistons are reciprocably mounted and means leading from said cylinder adapted to receive oil from said cylinder on the displacement of said pistons by the attraction of at least one of said plates towards its associated magnet.

PAUL SCHMIDT.